United States Patent
Nagao

(10) Patent No.: US 7,639,280 B2
(45) Date of Patent: Dec. 29, 2009

(54) IMAGE RECORDING APPARATUS, IMAGE REPRODUCING APPARATUS, IMAGE RECORDING METHOD, AND IMAGE REPRODUCING METHOD

(75) Inventor: Kenichiro Nagao, Chiba (JP)

(73) Assignee: Sony Corporation (JP)

( * ) Notice: Subject to any disclaimer, the term of this patent is extended or adjusted under 35 U.S.C. 154(b) by 369 days.

(21) Appl. No.: 11/818,400

(22) Filed: Jun. 13, 2007

(65) Prior Publication Data

US 2008/0259174 A1      Oct. 23, 2008

(30) Foreign Application Priority Data

Jun. 15, 2006   (JP)   ............... P2006-166102

(51) Int. Cl.
*H04N 5/225* (2006.01)
(52) U.S. Cl. ............. 348/220.1; 348/231.2; 348/333.02
(58) Field of Classification Search ............. 348/220.1, 348/222.1, 231.2, 231.3, 333.02, 333.04
See application file for complete search history.

(56) References Cited

U.S. PATENT DOCUMENTS

2002/0197067 A1* 12/2002 Ohnishi ................... 348/220.1
2004/0189823 A1* 9/2004 Shibutani ................. 348/231.1
2007/0031141 A1* 2/2007 Tanaka ........................ 396/287

FOREIGN PATENT DOCUMENTS

JP    2002-335528 A    11/2002
JP    2004-304425 A    10/2004

* cited by examiner

*Primary Examiner*—Lin Ye
*Assistant Examiner*—Gevell Selby
(74) *Attorney, Agent, or Firm*—Lerner, David, Littenberg, Krumholz & Mentlik, LLP

(57) ABSTRACT

An image recording apparatus recording motion picture data and still image data includes a management time adding unit that adds frame image display management times to temporally continuous multiple pieces of frame image data in the motion picture data; a management time detecting unit that detects the frame image display management time as a still image display management time; a presence indication data generating unit that generates presence indication data indicating that the still image data exists on the basis of the still image display management time; a multiplexing unit that outputs the motion picture data as recording data while only the motion picture photography is performed and that performs time division multiplexing to output the presence indication data and the motion picture data if the still photography is performed during the motion picture photography; and a recording unit that records the recording data.

9 Claims, 8 Drawing Sheets

IMAGE RECORDING APPARATUS, IMAGE REPRODUCING APPARATUS, IMAGE RECORDING METHOD, AND IMAGE REPRODUCING METHOD

CROSS REFERENCES CROSS-REFERENCE TO RELATED APPLICATIONS

The present application claims priority from Japanese Patent Application No. JP 2006-166102, filed in the Japanese Patent Office on Jun. 15, 2006, the entire content of which is incorporated herein by reference.

BACKGROUND OF THE INVENTION

1. Field of the Invention

The present invention relates to image recording apparatuses, image reproducing apparatuses, image recording methods, and image reproducing methods. The present invention is preferably applied to a video recorder integrated with a camera (hereinafter referred to as a video camera) having a function of capturing a still image of a subject (still photography).

2. Description of the Related Art

In motion picture photography of subjects, video cameras in related art measure times elapsed since the video cameras have started to generate motion picture data by the motion picture photography of the subjects on the basis of internal clock signals and add the measured times to temporally continuous pieces of frame image data forming the motion picture data. When the video cameras generate still image data by the still photography of the subjects during the motion picture photography, the video cameras add current times measured on the basis of the internal clock signals (hereinafter referred to as still photography times) to the header of the motion picture data. If a time five seconds before the still photography time added to the header of the motion picture data matches with a time added to the frame image data forming the motion picture data in a reproduction process of the motion picture data, the video cameras indicate that the still image data generated by the still photography of the subject during the motion picture photography exists (for example, Japanese Unexamined Patent Application Publication No. 2004-304425).

SUMMARY OF THE INVENTION

However, the video camera described above compares the time added to the frame image data forming the motion picture data with the time five seconds before the still photography time to indicate that the still image data generated by the still photography of the subject during the motion picture photography exists, concurrently with the reproduction process from the start time of the reproduction process of the motion picture data. Accordingly, there is a problem in that the video camera has a heavier processing load in the reproduction of the motion picture data recorded with the still image data generated by the still photography performed concurrently with the motion picture photography of the subject.

It is desirable to realize an image recording apparatus, an image reproducing apparatus, an image recording method, and an image reproducing method which are capable of reducing the processing load in the reproduction process of the motion picture data recorded with the still image data generated by the still photography during the motion picture photography.

According to an embodiment of the present invention, an image recording apparatus recording motion picture data generated by motion picture photography and still image data generated by still photography includes a management time adding unit that adds frame image display management times to temporally continuous multiple pieces of frame image data in the motion picture data generated by the motion picture photography, each of the frame image display management times being used for displaying and managing a frame image based on the frame image data; a management time detecting unit that detects the frame image display management time added to the piece of the frame image data generated by the still photography as a still image display management time for displaying and managing a still image based on the still image data generated by the still photography if the still photography is performed during the motion picture photography; a presence indication data generating unit that generates presence indication data indicating that the still image data generated by the still photography during the motion picture photography exists on the basis of the still image display management time; a multiplexing unit that sequentially acquires the motion picture data in which the frame image display management times are added to the pieces of the frame image data in predetermined units to output the acquired motion picture data as recording data while only the motion picture photography is performed and that performs time division multiplexing to the presence indication data in predetermined units and the motion picture data in predetermined units while sequentially acquiring the presence indication data in the predetermined units and sequentially acquiring the motion picture data in the predetermined units to output the presence indication data and the motion picture data subjected to the time division multiplexing as the recording data if the still photography is performed during the motion picture photography; and a recording unit that records the recording data on a recording medium.

According to another embodiment of the present invention, an image reproducing apparatus reproducing motion picture data that is generated by motion picture photography and is recorded and still image data that is generated by still photography and is recorded includes a reading unit that reads out recording data from a recording medium in which the motion picture data is sequentially recorded in predetermined units as the recording data while only the motion picture photography is performed, the motion picture data including temporally continuous multiple pieces of frame image data generated by the motion picture photography and frame image display management times which are used for displaying and managing frame images based on the frame image data and which are added to the multiple pieces of the frame image data, and in which presence indication data and the motion picture data sequentially subjected to time division multiplexing in predetermined units are recorded as the recording data if the still photography is performed during the motion picture photography, the presence indication data being generated by using each of the frame image display management times added to the piece of frame image data generated by the still photography as a still image display management time for displaying and managing a still image based on the still image data generated by the still photography, the presence indication data indicating that the still image data generated by the still photography during the motion picture photography exists; a demultiplexing unit that demultiplexes the readout recording data into the motion picture data in the predetermined units and the presence indication data in the predetermined units; and an indication processing unit that performs a presence indicating process, in which the presence of the still image data generated by the still photography during the motion picture photography is indicated, on the basis of the demultiplexed presence indication data when the presence indication data is demultiplexed from the recording data.

According to another embodiment of the present invention, an image recording method of recording motion picture data generated by motion picture photography and still image data generated by still photography includes the steps of adding frame image display management times to temporally continuous multiple pieces of frame image data in the motion picture data generated by the motion picture photography, each of the frame image display management times being used for displaying and managing a frame image based on the frame image data; detecting the frame image display management time added to the piece of the frame image data generated by the still photography as a still image display management time for displaying and managing a still image based on the still image data generated by the still photography if the still photography is performed during the motion picture photography; generating presence indication data indicating that the still image data generated by the still photography during the motion picture photography exists on the basis of the still image display management time; and sequentially acquiring the motion picture data in which the frame image display management times are added to the pieces of the frame image data in predetermined units to record the acquired motion picture data on a recording medium as recording data while only the motion picture photography is performed and performing time division multiplexing to the presence indication data in predetermined units and the motion picture data in predetermined units while sequentially acquiring the presence indication data in the predetermined units and sequentially acquiring the motion picture data in the predetermined units to record the presence indication data and the motion picture data on the recording medium as recording data if the still photography is performed during the motion picture photography.

According to another embodiment of the present invention, an image reproducing method of reproducing motion picture data that is generated by motion picture photography and is recorded and still image data that is generated by still photography and is recorded includes the steps of reading out recording data from a recording medium in which the motion picture data is sequentially recorded in predetermined units as the recording data while only the motion picture photography is performed, the motion picture data including temporally continuous multiple pieces of frame image data generated by the motion picture photography and frame image display management times which are used for displaying and managing frame images based on the frame image data and which are added to the multiple pieces of the frame image data, and in which presence indication data and the motion picture data sequentially subjected to time division multiplexing in predetermined units are recorded as the recording data if the still photography is performed during the motion picture photography, the presence indication data being generated by using each of the frame image display management times added to the piece of the frame image data generated by the still photography as a still image display management time for displaying and managing a still image based on the still image data generated by the still photography, the presence indication data indicating that the still image data generated by the still photography during the motion picture photography exists; demultiplexing the readout recording data into the motion picture data in the predetermined units and the presence indication data in the predetermined units; and performing a presence indicating process, in which the presence of the still image data generated by the still photography during the motion picture photography is indicated, on the basis of the demultiplexed presence indication data when the presence indication data is demultiplexed from the recording data.

Consequently, while only the motion picture photography is performed, the motion picture data in which the frame image display management times for displaying and managing the frame images based on the frame image data are added to the temporally continuous multiple pieces of the frame image data generated by the motion picture photography is sequentially recorded in the predetermined units as the recording data. If the still photography is performed during the motion picture photography, the presence indication data indicating the presence of the still image data generated by the still photography during the motion picture photography and the motion picture data are sequentially subjected to the time division multiplexing in the predetermined units to record the presence indication data and the motion picture data subjected to the time division multiplexing on the recording medium as the recording data. The presence indication data is generated by using the frame image display management time added to piece of the frame image data generated by the still photography during the motion picture photography as the still image display management time for displaying and managing the still image based on the still image data generated by the still photography. Consequently, only if the presence indication data is demultiplexed from the recording data when the recording data recorded along with the still image data generated by the still photography during the motion picture photography is reproduced, the indicating process in which the presence of the still image data generated by the still photography during the motion picture photography is indicated by using the presence indication data can be performed.

According to the embodiments of the present invention, while only the motion picture photography is performed, the motion picture data in which the frame image display management times for displaying and managing the frame images based on the frame image data are added to the temporally continuous multiple pieces of the frame images data generated by the motion picture photography is sequentially recorded in the predetermined units as the recording data. If the still photography is performed during the motion picture photography, the presence indication data indicating the presence of the still image data generated by the still photography during the motion picture photography and the motion picture data are sequentially subjected to the time division multiplexing in the predetermined units to record the presence indication data and the motion picture data subjected to the time division multiplexing on the recording medium as the recording data. The presence indication data is generated by using the frame image display management time added to the piece of the frame image data generated by the still photography during the motion picture photography as the still image display management time for displaying and managing the still image based on the still image data generated by the still photography. Consequently, only if the presence indication data is demultiplexed from the recording data when the recording data recorded along with the still image data generated by the still photography during the motion picture photography is reproduced, the indicating process in which the presence of the still image data generated by the still photography during the motion picture photography is indicated by using the presence indication data can be performed. As a result, it is possible to realize the image recording apparatus, the image reproducing apparatus, the image recording method, and the image reproducing method, which are capable of reducing the processing load in the reproduction of the motion picture data recorded along with the still image data generated by the still photography during the motion picture photography.

DESCRIPTION OF THE PREFERRED EMBODIMENTS

Embodiments of the present invention will now be described with reference to the attached drawings.

Figure 1:
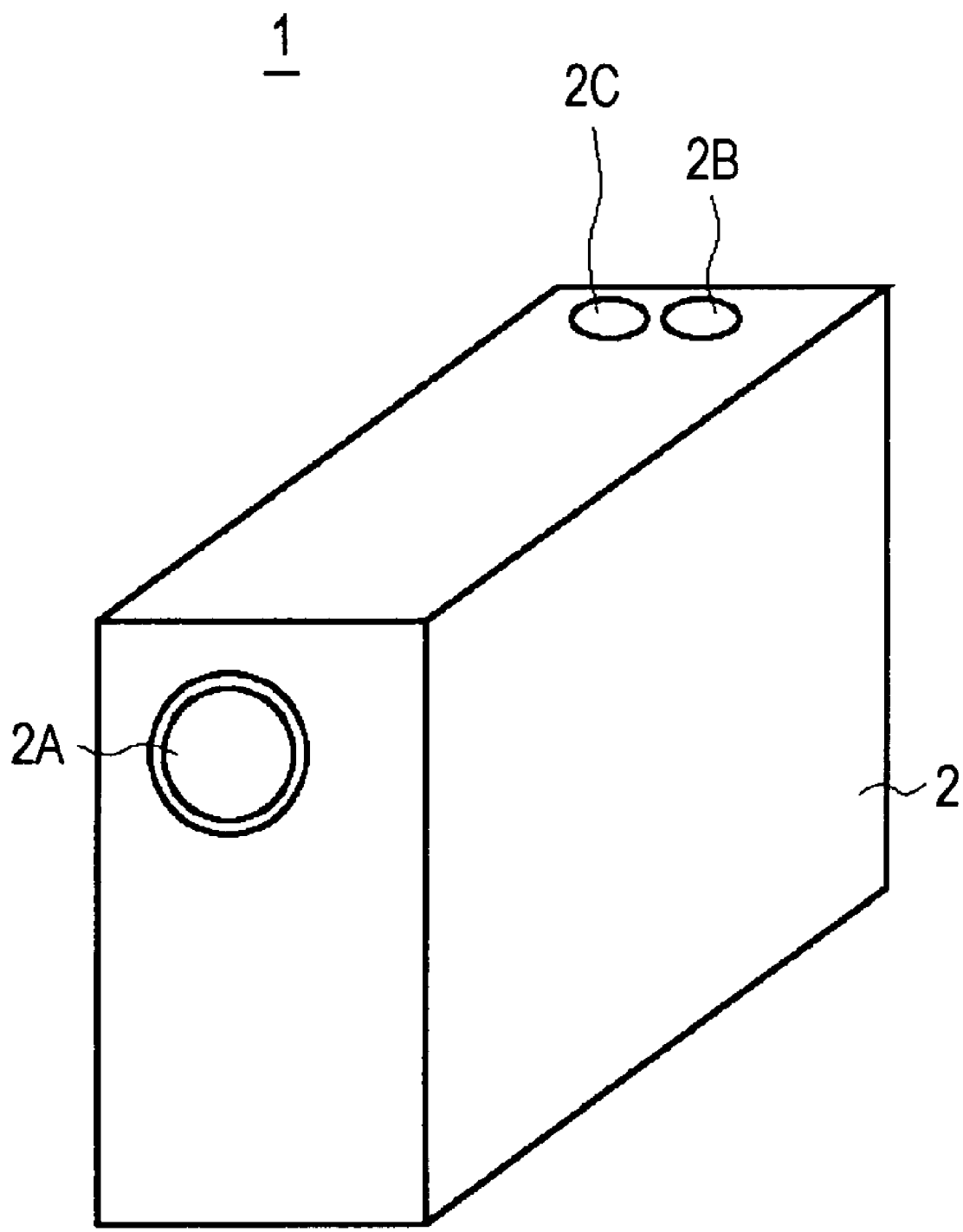
FIG. 1 is an external perspective view showing an example of the structure of a video camera according to an embodiment of the present invention.

FIG. 1 is an external perspective view showing an example of the structure of a video camera 1 according to an embodiment of the present invention. The video camera 1 has a substantially rectangular prismatic case 2. A lens 2A is provided on the front of the case 2, and various operation buttons including a shutter button 2B and a motion picture photography start/stop button 2C are provided at predetermined positions in, for example, a rear part of the top surface of the case 2. When the shutter button 2B on the case 2 is pressed, the video camera 1 captures a still image (still photography) of a subject with the lens 2A. The video camera 1 starts to take a motion picture (motion picture photography) of a subject when the motion picture photography start/stop button 2C on the case 2 is pressed and stops the motion picture photography of the subject when the motion picture photography start/stop button 2C is pressed again. The video camera 1 may separately perform the still photography of the subject and the motion picture photography thereof or may concurrently perform the still photography during the motion picture photography. The video camera 1 also has a display unit (not shown). The video camera 1 displays, in the display unit, a still image based on still image data generated by the still photography or a motion picture based on motion picture data generated by the motion picture photography.

Figure 2:
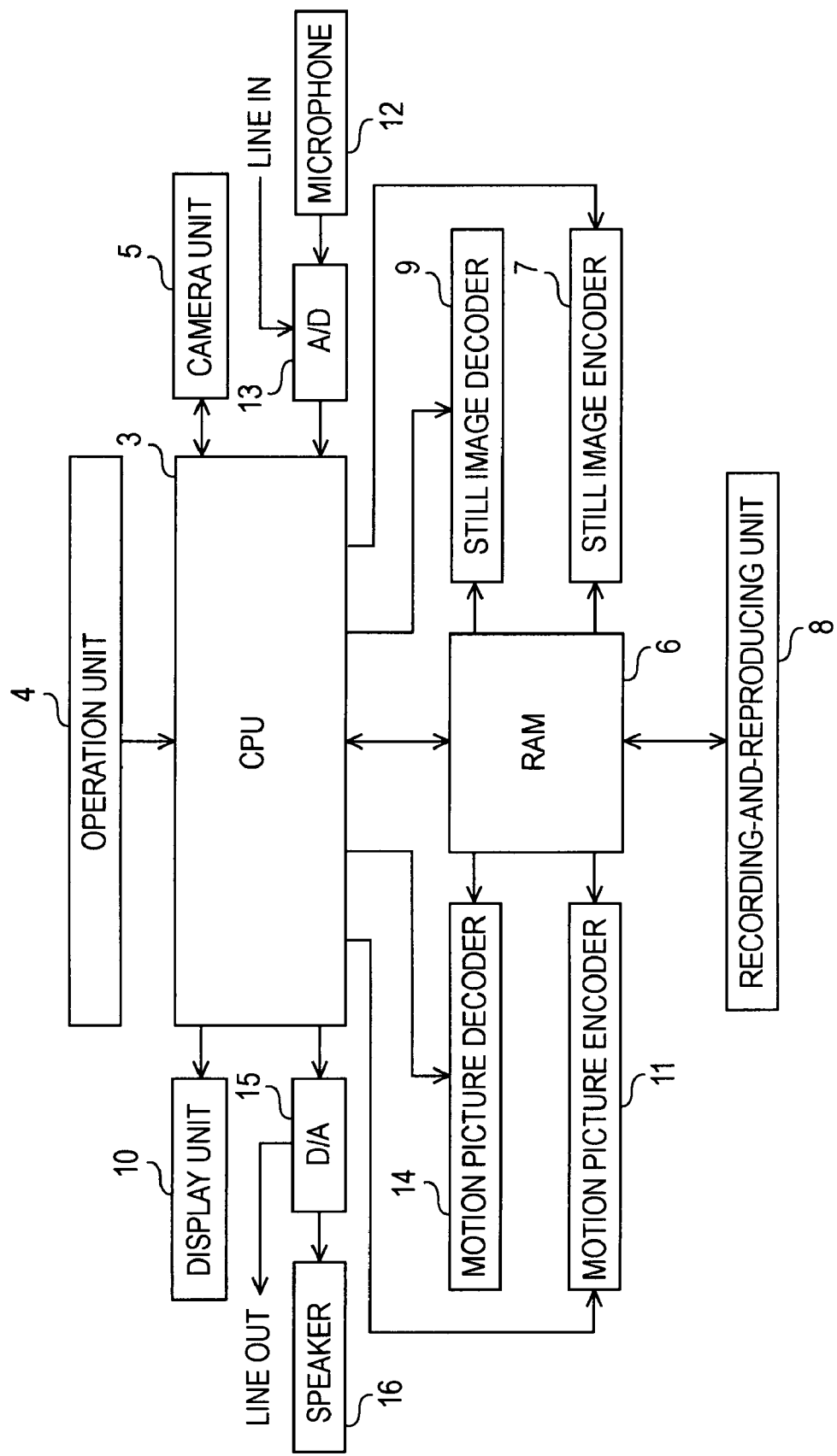
FIG. 2 is a block diagram showing an example of the circuit configuration of the video camera according to the embodiment of the present invention.

FIG. 2 is a block diagram showing an example of the circuit configuration of the video camera 1 according to the embodiment of the present invention. In the video camera 1, a central processing unit (CPU) 3 reads out various programs stored in a memory (not shown) in advance and executes the readout programs to control the entire video camera 1 and to perform a variety of processing. A still image encoder 7, a still image decoder 9, a motion picture encoder 11, a motion picture decoder 14, and a recording-and-reproducing unit 8 are connected to the CPU 3 via a random access memory (RAM) 6, such as a synchronous dynamic-random access memory (SDRAM). The CPU 3, the still image encoder 7, the still image decoder 9, the motion picture encoder 11, the motion picture decoder 14, and the recording-and-reproducing unit 8 use the RAM 6 as a working area.

Figure 3:
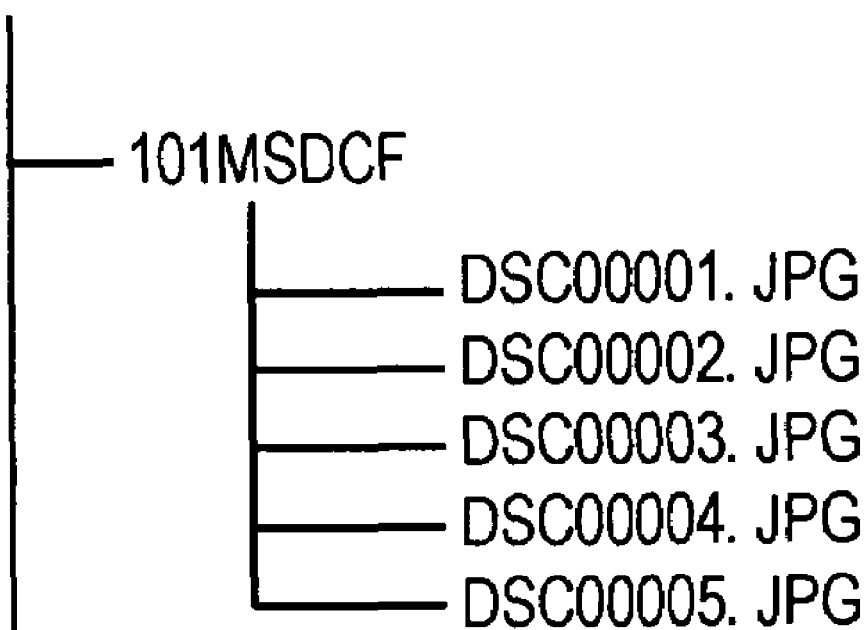
FIG. 3 shows how still image encoded data is recorded.

In a still image recording process in which a still image of a subject is captured to record the still image data, when the shutter button 2B in an operation unit 4 including the various buttons described above is pressed to issue a still photography instruction for the still photography of the subject from the operation unit 4, the CPU 3 acquires the still image data generated by the still photography of the subject using a camera unit 5 including the lens 2A described above and supplies the acquired still image data to the still image encoder 7. For example, the still image based on the still image data has a resolution higher than that of the motion picture based on the motion picture data generated by the motion picture photography of the subject. The still image encoder 7 compresses and encodes the still image data in a compression and encoding format, for example, Joint Photographic Experts Group (JPEG) to generate still image encoded data and supplies the generated still image encoded data to the CPU 3. The CPU 3 adds a file name to the still image encoded data in compliance with, for example, Exchangeable Image File Format (EXIF) and supplies the still image encoded data with the file name to the recording-and-reproducing unit 8. The recording-and-reproducing unit 8 records the still image encoded data on an optical disk (not shown) loaded in the case 2 in a file format. The CPU 3 manages the still image encoded data recorded on the optical disk in the file format in a hierarchical directory structure in compliance with the EXIF, as shown in FIG. 3. The CPU 3 adds file names, such as DSC00001.JPG, DSC0002.JPG, DSC00003.JPG, . . . , to the still image encoded data in compliance with the EXIF.

In a still image reproducing process in which the still image data is reproduced, when a still image reproducing instruction to reproduce the still image data is issued from the operation unit 4 in response to an operation with an operation key, the CPU 3 reads out the still image encoded data from the optical disk using the recording-and-reproducing unit 8 and supplies the readout still image encoded data to the still image decoder 9. The still image decoder 9 decodes the still image encoded data to generate still image data and supplies the generated still image data to the CPU 3. The CPU 3 supplies the still image data to a display unit 10 where a still image based on the still image data is displayed.

In a motion picture recording process in which a motion picture of a subject is taken to record the motion picture data, when the motion picture photography start/stop button 2C in the operation unit 4 is pressed to issue a motion picture photography start instruction to start to record the motion picture data generated by the motion picture photography of the subject from the operation unit 4, the CPU 3 starts to acquire motion picture data MD generated by the motion picture photography of the subject using the camera unit 5. In this case, the motion picture data MD includes temporally continuous multiple pieces of frame image data F (for example, 60 frames per second (FPS)). The CPU 3 measures time at, for example, 90 kHz on the basis of a reference clock, such as System Clock Reference (SCR), to generate display management times called presentation time stamps (PTSs) (hereinafter referred to as frame image display management times) for displaying and managing frame images based on the multiple pieces of the frame image data F forming the motion picture data MD and to add the generated frame image display management times to the pieces of the frame image data F in the motion picture data MD that is currently acquired. The CPU 3 sequentially supplies the motion picture data MD to which the frame image display management times are added to the motion picture encoder 11. The motion picture encoder 11 compresses and encodes the motion picture data MD in a compression and encoding format, for example, Moving Picture Experts Groups phase 2 (MPEG2) in predetermined units to generate packet data and supplies a data sequence of the packet data to the CPU 3 as a motion picture stream MS.

In the motion picture recording process, the CPU 3 performs analog-to-digital conversion using an analog-to-digital (A/D) conversion circuit 13 to an audio signal yielded by collecting an audio around the subject using a microphone 12, concurrently with the acquisition of the motion picture data MD from the camera unit 5, to acquire the audio signal as audio data A/D and supplies the audio data A/D to the motion picture encoder 11. The motion picture encoder 11 compresses and encodes the audio data A/D in predetermined units in compliance with the MPEG2 to generate packet data and supplies a data sequence of the packet data to the CPU 3 as an audio stream VS. In the motion picture recording process, the CPU 3 may acquire an audio signal, such as background music (BGM), from outside through the A/D conversion circuit 13 as the audio data A/D, instead of generating the audio signal using the microphone 12, and may compress and encode the audio data A/D using the motion picture encoder 11.

The CPU 3, then, performs time division multiplexing to the motion picture stream MS and the audio stream VS supplied from the motion picture encoder 11 in units of the packet data to generate recording data (hereinafter referred to as a program stream PS1) and supplies the generated program stream PS1 to the recording-and-reproducing unit 8. The recording-and-reproducing unit 8 records the program stream PS1 on the optical disk. In the manner described above, the CPU 3 records the motion picture data MD and the audio data A/D generated by the motion picture photography as the program stream PS1 until the motion picture photography start/stop button 2C in the operation unit 4 is pressed again to issue a motion picture photography stop instruction to stop the motion picture photography of the subject. After the motion picture photography stop instruction is issued, the CPU 3 stops the motion picture photography of the subject using the camera unit 5 and causes the recording-and-reproducing unit 8 to stop the recording of the program stream PS1 on the optical disk.

In a motion picture reproducing process in which the motion picture data is reproduced, when a motion picture reproducing instruction to reproduce the motion picture data is issued from the operation unit 4 in response to an operation with an operation key, the CPU 3 reads out the program stream PS1 from the optical disk using the recording-and-reproducing unit 8. The CPU 3 demultiplexes the program stream PS1 into the motion picture stream MS and the audio stream VS. The CPU 3 supplies the motion picture stream MS and the audio stream VS to the motion picture decoder 14. The motion picture decoder 14 decodes the motion picture stream MS in units of the packet data to generate the motion picture data MD and supplies the generated motion picture data MD to the CPU 3. The motion picture decoder 14 also decodes the audio stream VS in units of the packet data to generate the audio data A/D and supplies the generated audio data A/D to the CPU 3. The CPU 3 supplies the motion picture data MD to the display unit 10 where a motion picture based on the motion picture data MD is displayed. The CPU 3 performs digital-to-analog conversion to the audio data A/D using a digital-to-analog (D/A) conversion circuit 15 and supplies the audio data A/D subjected to the D/A conversion to a speaker 16 to cause the speaker 16 to output an audio based on the audio data A/D in synchronization with the display of the motion picture in the display unit 10. The CPU 3 may supply the audio data A/D from the D/A conversion circuit 15 to an external headphone, instead of the speaker 16, to cause the external headphone to output an audio, instead of causing the speaker 16 to output an audio.

If the still photography instruction is issued during the motion picture photography of the subject, the CPU 3 starts an image concurrent recording process in which the still image recording process described above is concurrently performed while continuing the motion picture recording process.

Figure 4:
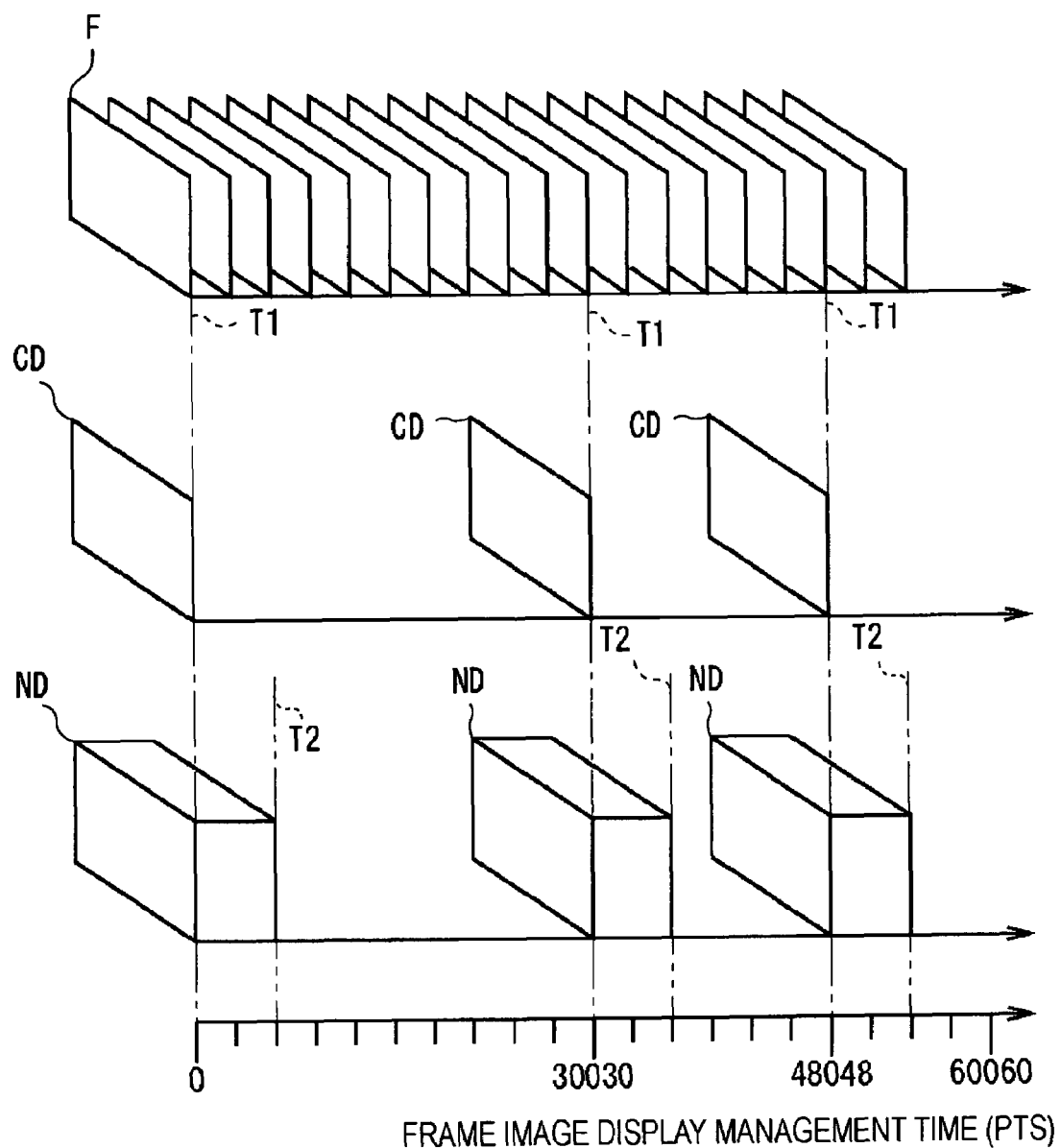
FIG. 4 illustrates the relationship between each data and a frame image display management time.
Figure 5:
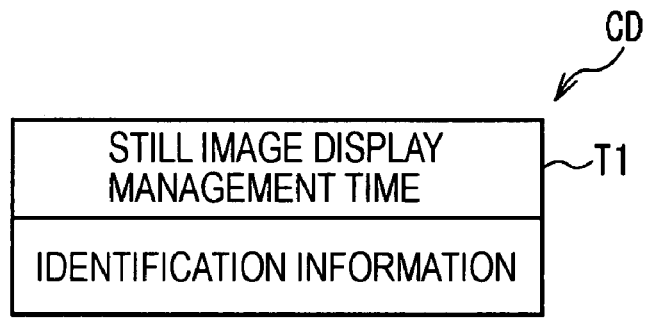
FIG. 5 illustrates first presence indication data.

In the image concurrent recording process, the CPU 3 acquires the still image data generated by the still photography of the subject, encodes the still image data using the still image encoder 7 to generate the still image encoded data, and supplies the generated still image encoded data to the recording-and-reproducing unit 8 to record the still image encoded data on the optical disk, in the same manner as in the still image recording process described above. The CPU 3 measures a time between the time when the frame image data F in the motion picture data MD generated by the motion picture photography of the subject is acquired from the camera unit 5 and the time when the frame image display management time is added to the frame image data F and stores the measured time as an internal delay time. Accordingly, the CPU 3 detects the frame image display management time added to the piece of the frame image data F when the internal delay time elapsed since the still image data is acquired from the camera unit 5, among the frame image display management times added to the pieces of the frame image data F in the motion picture data MD, as a display management time for displaying and managing the still image based on the still image data (this display management time is hereinafter referred to as a still image display management time T1), which corresponds to the time when the still photography is performed. The CPU 3 generates information, such as a path indicating a file name or an address of the still image data (that is, the still image encoded data), with which the still image data can be identified (this information is hereinafter referred to as identification information). The CPU 3 generates first presence indication data CD indicating the presence of the still image data which includes the still image display management time T1 and the identification information and which is generated by the still photography during the motion picture photography of the subject, as shown in FIGS. 4 and 5.

The CPU 3 uses the still image display management time T1 as an indication start time when the CPU 3 starts to indicate to a user that the still image data generated by the still photography during the motion picture photography of the subject exists. In addition, the CPU 3 detects a frame image display management time a predetermined time after the still image display management time T1, such as about five seconds after the still image display management time T1, among the frame image display management times added to the pieces of the frame image data F in the motion picture data MD, as an indication stop time T2 when the indication is stopped. Furthermore, the CPU 3 reads out predetermined image data (hereinafter referred to as indication image data), such as a character sequence "Photo", with which the presence of the still image data generated by the still photography of the subject during the motion picture photography can be determined by intuition at a glance (that is, with which the presence of the still image data generated by the still photography of the subject during the motion picture photography can be indicated) from a memory (not shown). The CPU 3 generates second presence indication data ND that includes the indication start time (that is, the still image display management time T1), the indication stop time T2, and the indication image data and that indicates that the still image data generated by the still photography during the motion picture photography of the subject exists.

In the manner described above, the CPU 3 associates one piece of the frame image data F in the motion picture data generated by the still photography at the still image display management time T1 with the still image data and associates the piece of the frame image data F with the first presence indication data CD and the second presence indication data ND. If the frame image data F to which the frame image display management time a predetermined time after the still image display management time T1 is added does not exist (that is, if the motion picture photography and the generation of the motion picture data MD are stopped before the predetermined time elapsed since the still image display management time T1) because the still photography, which is arbitrarily performed by the user, is performed just before the stopping of the motion picture photography, the CPU 3 detects the frame image display management time added to the final piece of the frame image data F, among the frame image display management times added to the pieces of the frame image data F, as the indication stop time T2. In the manner described above, the CPU 3 can set the frame image display management time without failure.

Then, the CPU 3 supplies the first presence indication data CD and the second presence indication data ND to the motion picture encoder 11. The motion picture encoder 11 generates a private stream defined to be available in the MPEG2 on the basis of the first presence indication data CD and the second presence indication data ND. Specifically, the motion picture encoder 11 sequentially compresses and encodes the first presence indication data CD in predetermined units in compliance with the MPEG2 to generate packet data and supplies a data sequence of the packet data to the CPU 3 as a private stream (hereinafter referred to as a first presence indication private stream CS). The motion picture encoder 11 sequentially compresses and encodes the second presence indication data ND in predetermined units in compliance with the MPEG2 to generate packet data and supplies a data sequence of the packet data to the CPU 3 as a private stream (hereinafter referred to as a second presence indication private stream NS).

Figure 6:
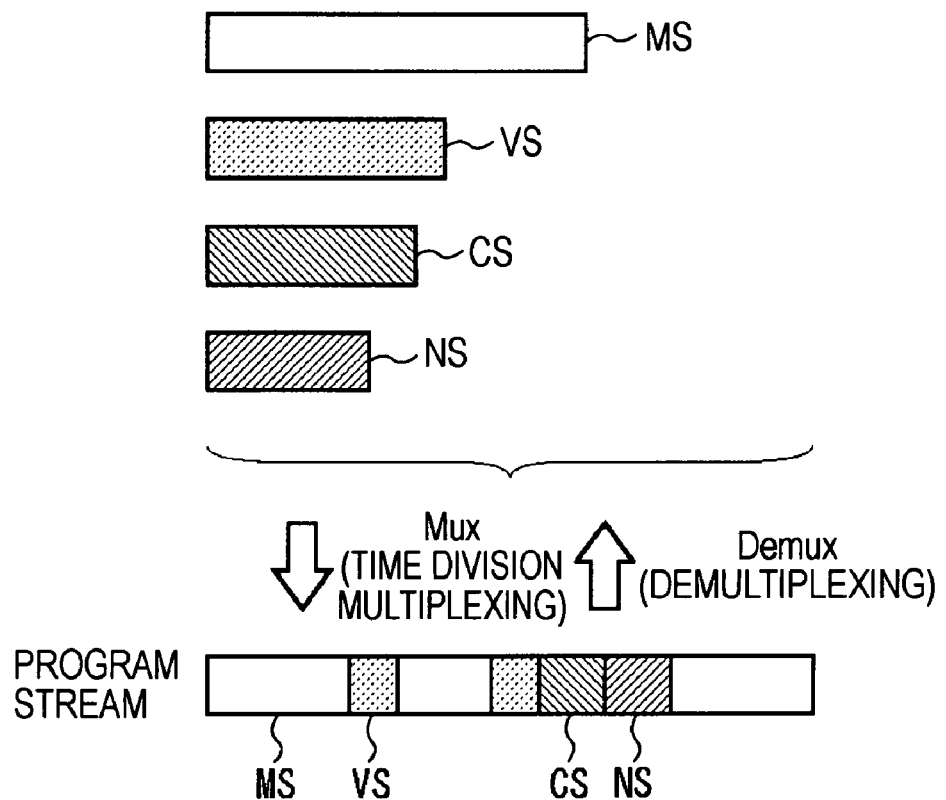
FIG. 6 illustrates time division multiplexing of streams.

As shown in FIG. 6, in the image concurrent recording process, the CPU 3 performs the time division multiplexing to the first presence indication private stream CS and the second presence indication private stream NS, in addition to the motion picture stream MS and the audio stream VS, in units of packets if the still photography is performed during the motion picture photography, while performing the time division multiplexing to the motion picture stream MS and the audio stream VS resulting from the motion picture photography of the subject in units of packets in the same manner as in the motion picture recording process, in order to generate a program stream PS2. After the CPU 3 supplies the program stream PS1 generated when only the motion picture photography is performed to the recording-and-reproducing unit 8, the CPU 3 also supplies the program stream PS2 resulting from the still photography during the motion picture photography to the recording-and-reproducing unit 8. The recording-and-reproducing unit 8 records the program stream PS2 on the optical disk.

In the manner described above, each time the still photography is performed during the motion picture photography, the CPU 3 generates and records the program stream PS2 resulting from the still photography, after generating and recording the program stream PS1 resulting only from the motion picture photography. Then, when the motion picture photography stop instruction is issued, the CPU 3 stops the motion picture photography of the subject using the camera unit 5 and causes the recording-and-reproducing unit 8 to stop the recording of the program stream PS1 and the program stream PS2 on the optical disk.

Figure 7:
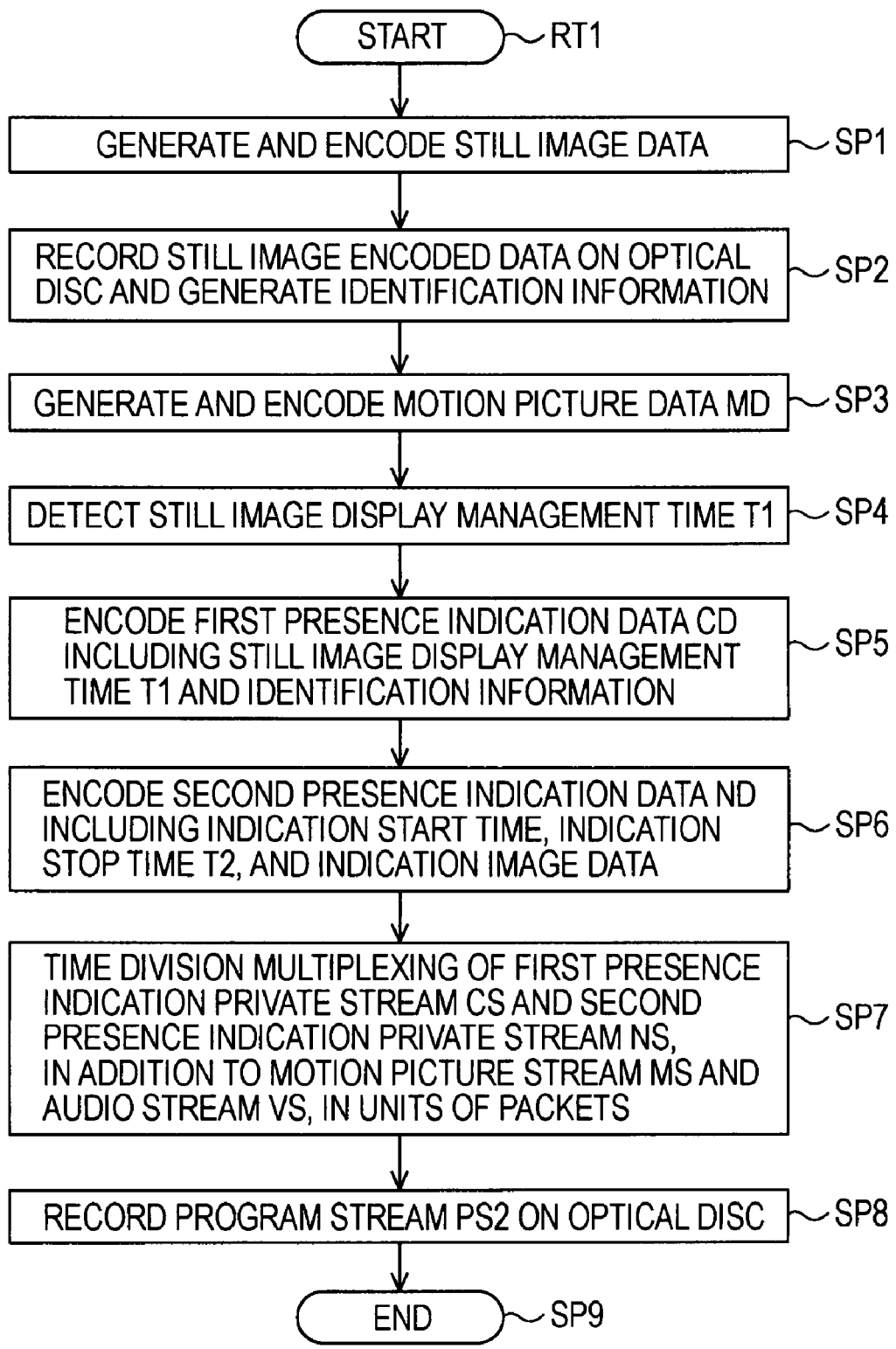
FIG. 7 is a flowchart showing an image concurrent recording process.

When the still photography instruction is issued while a motion picture of the subject is taken to generate the motion picture data MD, the video camera 1 starts an image concurrent recording process RT1 shown in FIG. 7, in which the still image recording process described above is performed concurrently with the motion picture recording process described above. After the image concurrent recording process RT1 is started, in Step SP1, the CPU 3 acquires still image data generated by the still photography of the subject with the camera unit 5 and supplies the still image data to the still image encoder 7. The still image encoder 7 compresses and encodes the still image data to generate still image encoded data.

In Step SP2, the CPU 3 generates identification information concerning the still image data (that is, the still image encoded data) and supplies the still image encoded data to the recording-and-reproducing unit 8. The recording-and-reproducing unit 8 records the still image encoded data on the optical disk in a file format.

In Step SP3, the CPU 3 adds the frame image display management times to the pieces of the frame image data F in the motion picture data MD currently acquired from the camera unit 5 and supplies the motion picture data MD to which the frame image display management times are added to the motion picture encoder 11. The motion picture encoder 11 compresses and encodes the motion picture data MD in predetermined units in compliance with the MPEG2 to generate the motion picture stream MS.

In Step SP4, the CPU 3 detects the frame image display management time added to the piece of the frame image data F generated by the still photography during the motion picture photography of the subject as the still image display management time T1.

In Step SP5, the CPU 3 generates the first presence indication data CD including the still image display management time T1 and the identification information and supplies the generated first presence indication data CD to the motion picture encoder 11. The motion picture encoder 11 sequentially compresses and encodes the first presence indication data CD in predetermined units in compliance with the MPEG2 to generate the first presence indication private stream CS.

In Step SP6, the CPU 3 uses the still image display management time T1 as the indication start time and detects the frame image display management time a predetermined time after the still image display management time T1 as the indication stop time T2. The CPU 3 generates the second presence indication data ND including the indication start time, the indication stop time T2, and the indication image data and supplies the generated second presence indication data ND to the motion picture encoder 11. The motion picture encoder 11 sequentially compresses and encodes the second presence indication data ND in predetermined units in compliance with the MPEG2 to generate the second presence indication private stream NS.

In Step SP7, the CPU 3 performs the time division multiplexing to the motion picture stream MS, the audio stream VS, the first presence indication private stream CS, and the second presence indication private stream NS, which are supplied from the motion picture encoder 11 in units of the packet data to generate the program stream PS2.

In Step SP8, the CPU 3 supplies the program stream PS2 to the recording-and-reproducing unit 8. The recording-and-reproducing unit 8 records the program stream PS2 on the optical disk. In Step SP9, the CPU 3 terminates the image concurrent recording process RT1. After terminating the image concurrent recording process RT1, the CPU 3 performs the motion picture recording process described above and performs the image concurrent recording process RT1 each time the still photography is performed during the motion picture photography until the motion picture photography stop instruction is issued.

Figure 8A:
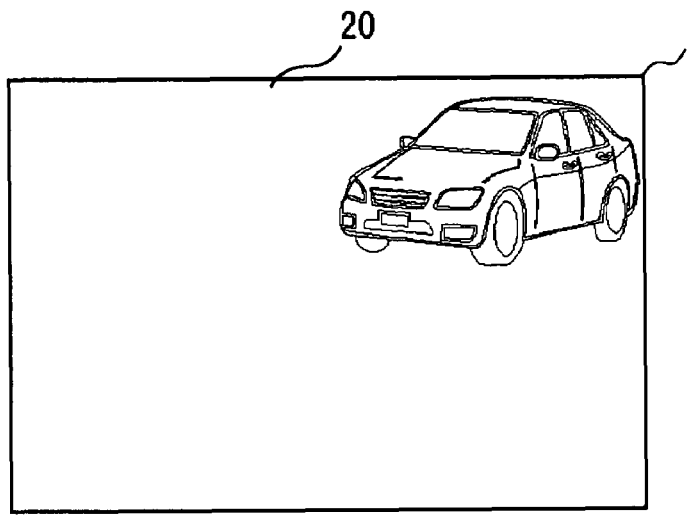
FIGS. 8A to 8C show how an indication image is displayed.

When the CPU 3 performs the still photography during the motion picture photography of the subject in response to the motion picture reproducing instruction to reproduce the program stream PS1 recorded by performing only the motion picture photography and the program stream PS2 recorded along with the still image data generated by the still photography during the motion picture photography, the CPU 3 reads out the program stream PS1 and the program stream PS2 from the optical disk using the recording-and-reproducing unit 8, in the same manner as in the motion picture reproducing process. The CPU 3 sequentially demultiplexes the program stream PS1 into the motion picture stream MS and the audio stream VS in units of the packet data and decodes the motion picture stream MS and the audio stream VS using the motion picture decoder 14 to generate the motion picture data MD and the audio data A/D. The CPU 3 sequentially displays a frame image 20 based on the motion picture data MD in the display unit 10, as shown in FIG. 8A, and outputs an audio based on the audio data A/D from the speaker 16 in synchronization with the display of the frame image 20 in the display unit 10.

When the CPU 3 reads out the program stream PS2 from the optical disk and demultiplexes the program stream PS2 into the motion picture stream MS, the audio stream VS, the first presence indication private stream CS, and the second presence indication private stream NS, the CPU 3 starts a still image presence indicating process to indicate the presence of the still image data generated by the still photography of the subject during the motion picture photography.

In the still image presence indicating process, the CPU 3 supplies the first presence indication private stream CS and the second presence indication private stream NS, in addition to the motion picture stream MS and the audio stream VS, to the motion picture decoder 14. The motion picture decoder 14 generates the motion picture data MD and the audio data A/D from the motion picture stream MS and the audio stream VS, respectively, in the same manner as in the motion picture reproducing process described above, and supplies the generated motion picture data MD and audio data A/D to the CPU 3. In addition, the motion picture decoder 14 decodes the first presence indication private stream CS in units of the packet data to generate the first presence indication data CD and supplies the generated first presence indication data CD to the CPU 3. Furthermore, the motion picture decoder 14 decodes the second presence indication private stream NS in units of the packet data to generate the second presence indication data ND and supplies the generated second presence indication data ND to the CPU 3. The CPU 3 compares the frame image display management times added to the multiple pieces of the frame image data F in the motion picture data MD being reproduced with the still image display management time T1 included in the first presence indication data CD.

Figure 8B:
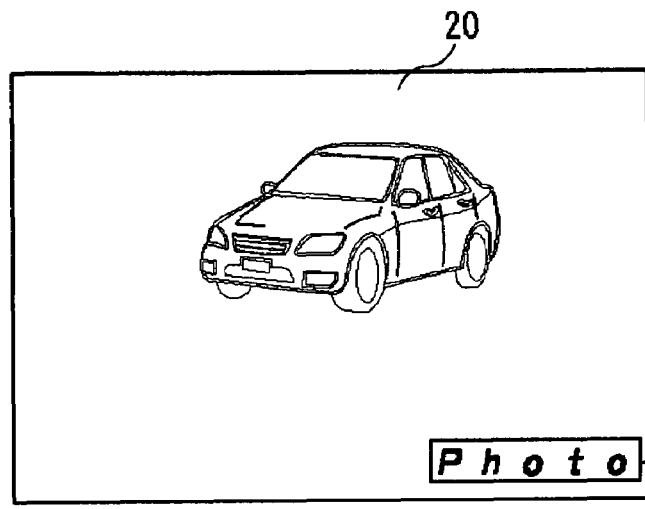

If the CPU 3 detects any frame image display management time matched with the still image display management time T1 from the frame image display management times added to the multiple pieces of the frame image data F in the motion picture data MD, the CPU 3 combines the pieces of the frame image data F subsequent to the piece of the frame image data F to which the detected frame image display management time is added with the indication image data included in the second presence indication data ND associated with the first presence indication data CD on the basis of the still image display management time T1 to generate combined data and supplies the combined data to the display unit 10 on the basis of the frame image display management time added to the original piece of the frame image data F. As a result, as shown in FIG. 8B, the CPU 3 displays the frame image 20 based on the piece of the frame image data F in the display unit 10 on the basis of the combined data and superimposes an indication image 21 based on the indication image data on the frame image 20. In this manner, the CPU 3 indicates to the user the presence of the still image data generated by the still photography at the same photography direction and at approximately the same camera angle as those in the motion picture photography during the motion picture photography and also indicates to the user when the still photography is performed during the motion picture photography, by using the indication image 21 superimposed on the frame image 20.

Figure 8C:
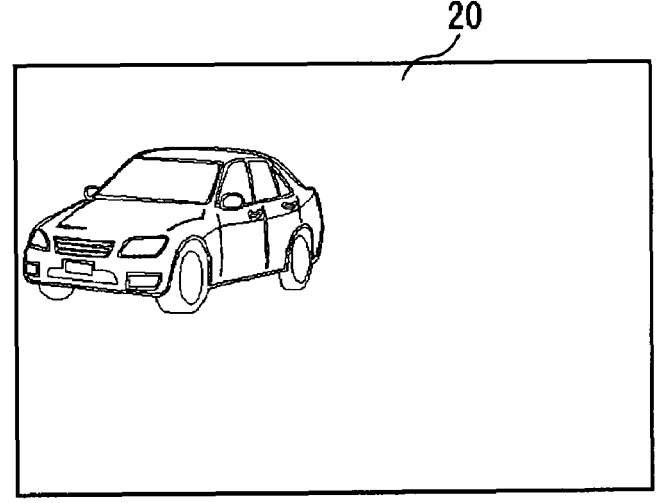

The CPU 3 compares the frame image display management times added to the pieces of the frame image data F in the motion picture data MD being reproduced with the indication stop time T2 included in the second presence indication data ND. The CPU 3 superimposes the indication image 21 on the frame image 20, which is sequentially switched, until the frame image display management time added to any piece of the frame image data F in the motion picture data MD being reproduced matches with the indication stop time T2. When any frame image display management time among the frame image display management times added to the multiple pieces of the frame image data F in the motion picture data MD being reproduced matches with the indication stop time T2, the CPU 3 stops the combination of the indication image data with the piece of the frame image data F to which the frame image display management time matched with the indication stop time T2 is added and does not combine the indication image data with the pieces of the frame image data F to which the frame image display management times subsequent to the frame image display management time matched with the indication stop time T2 are added. As a result, as shown in FIG. 8C, after the frame image display management time matches with the indication stop time T2, the CPU 3 sequentially supplies only the frame image data to the display unit 10 on the basis of the frame image display management time to display only the frame image 20 based on the frame image data F in the display unit 10. The CPU 3 stops the indication of the presence of the still image data generated by still photography of the subject during the motion picture photography in the manner described above.

If the still image reproducing instruction is issued in the still image presence indication process (that is, when the CPU 3 displays the indication image to indicate the presence of the still image data generated by the still photography of the subject during the motion picture photography), the CPU 3 pauses the readout of the program stream PS2 from the optical disk using the recording-and-reproducing unit 8 to stop the display of the frame image 20 and the indication image 21 in the display unit 10. The CPU 3 uses the identification information included in the first presence indication data CD to read out the still image encoded data corresponding to the identification information from the optical disk using the recording-and-reproducing unit 8 and supplies the readout still image encoded data to the still image decoder 9. The still image decoder 9 decodes the still image encoded data to generate the still image data and supplies the generated still image data to the CPU 3. The CPU 3 supplies the still image data to the display unit 10 to display a still image based on the still image data. The CPU 3 can display one scene that is being subjected to the motion picture photography as a still image having a higher resolution, which is generated by the still photography at the same photography direction and at approximately the same camera angle as in the motion picture photography, during the motion picture reproducing process.

If a motion picture reproduction restarting instruction to restart the display of the frame image 20 is issued from the operation unit 4 in response to an operation with an operation key, the CPU 3 stops the display of the still image in the display unit 10 and restarts the readout of the program stream PS2 that has been paused to restart the display of the frame image 20 from the pause point.

Figure 9:
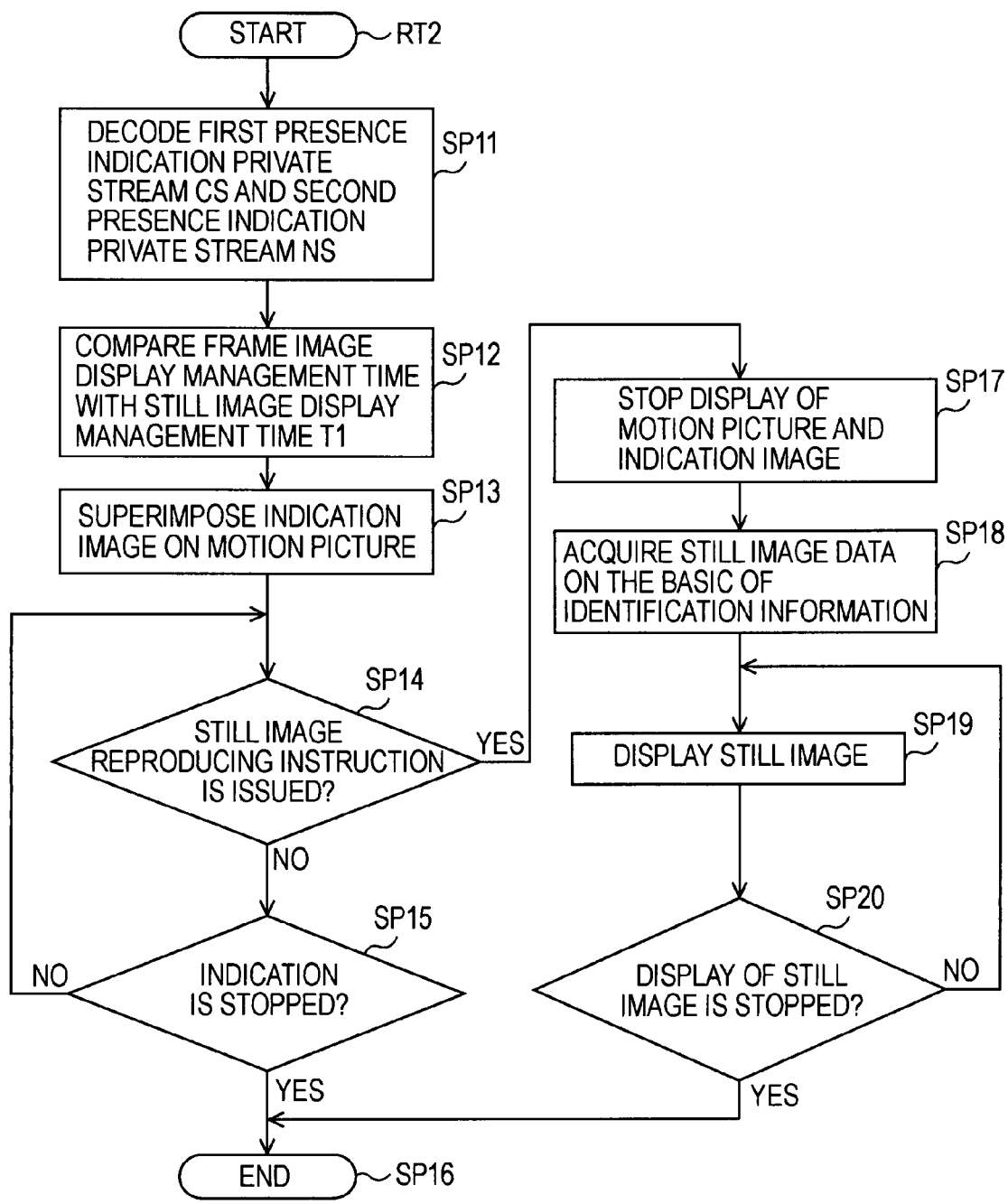
FIG. 9 is a flowchart showing a still image presence indicating process.

When the video camera 1 performs the still photography concurrently with the motion picture photography during the motion picture reproducing process to demultiplex the program stream PS2 recorded along with the still image data generated by the still photography into the first presence indication private stream CS and the second presence indication private stream NS, the video camera 1 starts a still image presence indicating process RT2 shown in FIG. 9.

After the still image presence indicating process RT2 is started, in Step SP1, the CPU 3 supplies the first presence indication private stream CS and the second presence indication private stream NS along with the motion picture stream MS and the audio stream VS demultiplexed from the program stream PS2 to the motion picture decoder 14. The motion picture decoder 14 decodes the motion picture stream MS and the audio stream VS and also decodes the first presence indication private stream CS and the second presence indication private stream NS to generate the motion picture data MD, the audio data A/D, the first presence indication data CD, and the second presence indication data ND.

In Step SP12, the CPU 3 compares the frame image display management times added to the pieces of the frame image data F in the motion picture data MD being reproduced with the still image display management time T1 included in the first presence indication data CD and goes to Step SP13 if the frame image display management time added to any piece of the frame image data F matches with the still image display management time T1.

In Step SP13, the CPU 3 combines the pieces of the frame image data F subsequent to the piece of the frame image data F to which the frame image display management time matched with the still image display management time T1 is added with the indication image data included in the second presence indication data ND to start to generate combined data. The CPU 3 supplies the combined data to the display unit 10 on the basis of the frame image display management time to superimpose the indication image 21 on the frame image 20 in the display unit 10 in order to indicate that the still image data generated by the still photography of the subject during the motion picture photography exists. The CPU 3 starts to compare the frame image display management times added to the pieces of the frame image data F in the motion picture data MD being reproduced with the indication stop time T2 included in the second presence indication data ND.

In Step SP14, the CPU 3 determines whether the still image reproducing instruction is issued. The negative determination in Step SP14 indicates that the user does not request the display of the still image generated by the still photography of the subject during the motion picture photography but requests continuation of the display of the motion picture generated by the motion picture photography. Accordingly, if the determination in Step SP14 is negative, the CPU 3 goes to Step SP15.

In Step SP15, the CPU 3 determines whether the indication of the presence of the still image data generated by the still photography of the subject during the motion picture photography is stopped. The negative determination in Step SP15 indicates that the frame image 20 based on the piece of the frame image data F to which the still image display management time T1 matched with the indication stop time T2 is added has not been displayed yet. Accordingly, if the determination in Step SP15 is negative, the CPU 3 goes back to Step SP14. Until the affirmative determination is achieved in Step SP14 or SP15, the CPU 3 repeats Step SP14 or SP15 to continue to indicate to the user that the still image data generated by the still photography of the subject during the motion picture photography exists. The affirmative determination in Step SP15 indicates that the indication of the presence of the still image data generated by the still photography of the subject during the motion picture photography is stopped because the indication stop time T2 matches with the frame image display management time added to the piece of the frame image data F being reproduced. Accordingly, if the determination in Step SP15 is affirmative, the CPU 3 goes to Step SP16 to terminate the still image presence indicating process RT2.

The affirmative determination in Step SP14 indicates that the user requests the display the still image based on the still image data generated by the still photography of the subject during the motion picture photography. Accordingly, if the determination in Step SP14 is affirmative, the CPU 3 goes to Step SP17.

In Step SP17, the CPU 3 pauses the readout of the program stream PS2 from the optical disk using the recording-and-reproducing unit 8 to stop the display of the frame image 20 and the indication image 21 in the display unit 10.

In Step in SP18, the CPU 3 reads out the still image encoded data from the optical disk using the recording-and-reproducing unit 8 in accordance with the identification information included in the first presence indication data CD and supplies the readout still image encoded data to the still image decoder 9. The still image decoder 9 decodes the still image encoded data to generate still image data.

In Step SP19, the CPU 3 supplies the still image data to the display unit 10 to display a still image based on the still image data.

In Step SP 20, the CPU 3 waits a request for the stopping of the display of the still image in the display unit 10. If the stopping of the display of the still image in the display unit 10 is requested, the CPU 3 stops the display of the still image in the display unit 10 and restarts the readout of the program stream PS2 that has been paused to restart the display of the frame image 20. The CPU 3 goes to Step SP16 to terminate the still image presence indicating process RT2.

If the still photography is performed during the motion picture photography, the video camera 1 according to the embodiments of the present invention compresses and encodes the still image data generated by the still photography to generate the still image encoded data and records the generated still image encoded data on the optical disk using the recording-and-reproducing unit 8. The video camera 1 adds the frame image display management times to the pieces of the frame image data F while acquiring the motion picture data MD generated by the motion picture photography to detect the frame image display management time added to the piece of the frame image data F generated by the still photography as the still image display management time T1. The video camera 1 generates the identification information used for identifying the still image encoded data and generates the first presence indication data CD including the still image display management time T1 and the identification information. In addition, the video camera 1 uses the still image display management time T1 as the indication start time and detects the frame image display management time a predetermined time after the still image display management time T1, among the frame image display management times added to the pieces of the frame image data F in the motion picture data MD, as the indication stop time T2 to generate the second presence indication data ND including the indication start time, the indication stop time T2, and the indication image data.

The video camera 1 sequentially compresses and encodes the first presence indication data CD in predetermined units to generate the first presence indication private stream CS and sequentially compresses and encodes the second presence indication data ND in predetermined units to generate the second presence indication private stream NS. The video camera 1 performs the time division multiplexing to the first presence indication private stream CS and the second presence indication private stream NS, in addition to the motion picture stream MS and the audio stream VS, in units of packets, if the still photography is performed during the motion picture photography, while performing the time division multiplexing to the motion picture stream MS and the audio stream VS resulting from the motion picture photography of the subject in units of packets, to generate the program stream PS1 and the program stream PS2 and records the generated the program stream PS1 and the program stream PS2 on the optical disk.

If the video camera 1 demultiplexes only the motion picture stream MS and the audio stream VS from the program streams PS1 and the PS2 when the video camera 1 reads out the program stream PS1 and the program stream PS2 recorded on the optical disk in the still photography during the motion picture photography from the optical disk, the video camera 1 decodes the motion picture stream MS and the audio stream VS to output a motion picture and an audio which the user listens to. In contrast, if the video camera 1 demultiplexes the first presence indication private stream CS and the second presence indication private stream NS, in addition to the motion picture stream MS and the audio stream VS, from the program streams PS1 and PS2, the video camera 1 compares the frame image display management times added to the pieces of the frame image data F in the motion picture data MD yielded by decoding the motion picture stream MS with the still image display management time T1 included in the first presence indication data CD generated by decoding the first presence indication private stream CS. If the frame image display management time added to any piece of the frame image data F matches with the still image display management time T1, the video camera 1 combines the indication image data included in the second presence indication data ND yielded by decoding the second presence indication private stream NS with the piece of the frame image data F to which the frame image display management time matched with the still image display management time T1 is added and supplies the combined data to the display unit 10. The video camera 1 displays the frame image 20 and the indication image 21 in the display unit 10 to indicate to the user that the still image data generated by the still photography during the motion picture photography exists.

If the video camera 1 demultiplexes only the motion picture stream MS and the audio stream VS from the program stream PS1 when the video camera 1 reproduces the program stream PS1 and the program stream PS2 recorded on the optical disk in the still photography during the motion picture photography, the video camera 1 does not perform the still image presence indicating process. Only if the video camera 1 demultiplexes the first presence indication private stream CS and the second presence indication private stream NS from the program stream PS2, the video camera 1 performs the still image presence indicating process on the basis of the first presence indication private stream CS and the second presence indication private stream NS.

As described above, the video camera 1 adds the frame image display management times to the multiple pieces of the frame image data F in the motion picture data MD generated by the motion picture photography and compresses and decodes the motion picture data MD to generate the program stream PS1. The video camera 1 records the program stream PS1 while only the motion picture photography is performed and detects the frame image display management time added to the piece of the frame image data F generated when the still photography is performed during the motion picture photography as the still image display management time T1. The video camera 1 uses the detected still image display management time T1 to generate the first presence indication data CD and the second presence indication data ND and compresses and encodes the first presence indication data CD and the second presence indication data ND to generate the first presence indication private stream CS and the second presence indication private stream NS. The video camera 1 performs the time division multiplexing to the first presence indication private stream CS and the second presence indication private stream NS, in addition to the motion picture stream MS and the audio stream VS, in units of the packet data to generate the program stream PS2 and records the program stream PS2 on the recording medium. Accordingly, only if the video camera 1 demultiplexes the first presence indication private stream CS and the second presence indication private stream NS from the program stream PS2 when the video camera 1 reproduces the program stream PS2 recorded along with the still image data generated by the still photography during the motion picture photography, the video camera 1 can perform the still image presence indicating process on the basis of the first presence indication private stream CS and the second presence indication private stream NS. Consequently, it is possible to reduce the processing load in the reproduction of the program stream PS2 recorded along with the still image data generated by the still photography during the motion picture photography.

The video camera 1 detects the frame image display management time added to the piece of the frame image data F generated by the still photography during the motion picture photography as the still image display management time T1 and detects the indication stop time T2 on the basis of the still image display management time T1 to generate the second presence indication private stream NS including the indication start time, which is the still image display management time T1, the indication stop time T2, and the indication image data. Accordingly, only if the video camera 1 demultiplexes the second presence indication private stream NS from the program stream PS2 when the video camera 1 reproduces the program stream PS2 recorded along with the still image data generated by the still photography during the motion picture photography, the video camera 1 can superimpose the indication image 21 on the frame image 20 by using the second presence indication private stream NS to indicate that the still image data generated by the still photography during the motion picture photography exists and to indicate when the still photography is performed during the motion picture photography.

The video camera 1 uses the frame image display management time added to the piece of the frame image data F generated by the still photography during the motion picture photography as the still image display management time T1 and generates the first presence indication private stream CS including the still image display management time T1 and the identification information used for identifying the still image data. Accordingly, only if the video camera 1 demultiplexes the first presence indication private stream CS from the program stream PS2 when the video camera 1 reproduces the program stream PS2 recorded along with the still image data generated by the still photography during the motion picture photography, the video camera 1 can use the first presence indication private stream CS to identify the still image data generated by the still photography during the motion picture photography in order to read out the still image data from the optical disk.

Although the still image data is compressed and encoded in the JPEG format in the above embodiments, embodiments of the present invention are not limited to the compression and encoding in the JPEG format. The still image data may be compressed and encoded in Graphic Interchange Format (GIF) or the still image data may be recorded without being compressed and encoded.

Although the motion picture data MD, the audio data A/D, the first presence indication data CD, and the second presence indication data ND are compressed and encoded in predetermined units in compliance with the MPEG2 in the above embodiments, embodiments of the present invention are not limited to the MPEG2. The motion picture data MD, the audio data A/D, the first presence indication data CD, and the second presence indication data ND may be compressed and encoded in a general-purpose compression and encoding format, such as MPEG1 or MEPG4. In this case, since the program streams PS1 and PS2 that are generated by the time division multiplexing in units of the packet data of each stream generated by compressing and encoding the motion picture data MD, the audio data A/D, the first presence indication data CD, and the second presence indication data ND in predetermined units are compressed and encoded in the general-purpose compression and encoding format, the program streams PS1 and PS2 can be reproduced by many other consumer appliances. The motion picture data MD, the audio data A/D, the first presence indication data CD, and the second presence indication data ND may be subjected to the time division multiplexing in predetermined units without being compressed and encoded.

Although the indication image data is used to indicate that the still image data generated by the still photography during the motion picture photography exists in the above embodiments, embodiments of the present invention are not limited to the use of the indication image data. A variety of indication data including thumbnail images corresponding to the still image data recorded on the optical disk, indication audio data used for outputting an audio, and light emitting diode (LED) data may be used as long as it is possible to indicate that the still image data generated by the still photography during the motion picture photography exists by using the indication data.

Although the display of the still image in the display unit 10 is stopped and the display of the frame image 20 is restarted if the motion picture reproduction restarting instruction is issued while the still image is displayed in the display unit 10 in the still image presence indicating process in the above embodiments, embodiments of the present invention are not limited to this case. The display of the still image in the display unit 10 may be automatically stopped and the display of the frame image 20 may be automatically restarted at a time when a predetermined time elapsed since the display of the still image is started without the motion picture reproduction restarting instruction. When the display of the frame image 20 is restarted, the frame image 20 may be displayed from the beginning or may be displayed from a point corresponding to a predetermined time before the display of the frame image 20 is stopped.

Although the indication image 21 is superimposed on the frame image 20 in the display unit 10 to indicate that the still image data generated by the still photography of the subject during the motion picture photography exists if the frame image display management time added to any piece of the frame image data F in the motion picture data MD being reproduced matches with the still image display management time T1 in the still image presence indicating process in the above embodiments, embodiments of the present invention are not limited to this case. The frame image 20 may be automatically replaced with the still image to display the still image in the display unit 10 each time the frame image display management time matches with the still image display management time T1 during the reproduction of the motion picture data MD. The display time of the still image may be set in advance and the display between the frame image 20 and the still image may be automatically switched during the reproduction of the motion picture data MD. The switching in the display between the frame image and the still image may be via effect processing, such as wipe or dissolve. In this case, the effect processing is started when the frame image display management time added to any piece of the frame image data F in the motion picture data MD being reproduced matches with the still image display management time T1.

Although the first presence indication data CD including the still image display management time T1 and the identification information is generated and the second presence indication data ND including the still image display management time T1, the indication stop time T2, and the indication image data is generated in the above embodiments, embodiments of the present invention are not limited to this case. Presence indication data including the still image display management time T1, the indication stop time T2, the identification information, and the indication image data may be generated.

Although the still image display management time T1 is used as the indication start time when the indication of the presence of the still image data generated by the still photography of the subject during the motion picture photography is stared in the above embodiments, embodiments of the present invention are not limited to the above cases. The indication start time may be set to a time a predetermined time before the still image display management time T1. When the indication start time is set to a time a predetermined time before the still image display management time T1, the frame image display management times added to the pieces of the frame image data F in the motion picture data MD being reproduced are compared with an indication start time before the still image display management time T1, instead of the comparison of the frame image display management times added to the pieces of the frame image data F in the motion picture data MD being reproduced with the still image display management time T1, in the still image presence indicating process. As a result, it is possible to indicate that the still image data generated by the still photography of the subject during the motion picture photography exists in synchronization with the reproduction of the motion picture data MD without any delay from the indication start time.

Although the image recording apparatus according to the embodiment of the present invention is applied to the video camera 1 described above with reference to FIGS. 1 to 9 in the above embodiments, embodiments of the present invention are not limited to this application. The image recording apparatus according to the embodiment of the present invention is widely applicable to various image recording apparatuses including a mobile phone with a camera, a digital still camera, a personal computer with a camera, and an image recording apparatus detachable from a camera unit.

Although the image reproducing apparatus according to the embodiment of the present invention is applied to the video camera 1 described above with reference to FIGS. 1 to 9 in the above embodiments, embodiments of the present invention are not limited to this application. The image reproducing apparatus according to the embodiment of the present invention is widely applicable to various image reproducing apparatuses including a mobile phone with a camera, a digital still camera, a personal computer with a camera, an image reproducing apparatus detachable from a camera unit, a digital versatile disk (DVD) recorder, and a personal computer.

Although the CPU 3 described above with reference to FIGS. 1 to 9 is applied to the management time adding unit that adds the frame image display management times used for managing and displaying the frame images based the frame image data to the temporally continuous multiple pieces of the frame image data in the motion picture data generated during the motion picture photography in the above embodiments, embodiments of the present invention are not limited to this case. Various management time adding units including a management time adding circuit in a hardware configuration, which adds the frame image display management times used for managing and displaying the frame images based the frame image data to the temporally continuous multiple pieces of the frame image data in the motion picture data generated during the motion picture photography, are widely applicable to the management time adding unit according to the embodiment of the present invention.

Although the CPU 3 described above with reference to FIGS. 1 to 9 is applied to the management time detecting unit that detects the frame image display management time added to the piece of the frame image data generated by the still photography during the motion picture photography as the still image display management time used for managing and displaying the still image based the still image data generated the still photography during the motion picture photography in the above embodiments, embodiments of the present invention are not limited to this case. Various management time detecting units including a management time detecting circuit in a hardware configuration, which detects the frame image display management time added to the piece of the frame image data generated by the still photography during the motion picture photography as the still image display management time used for managing and displaying the still image based the still image data generated the still photography during the motion picture photography, are widely applied to the management time detecting unit according to the embodiment of the present invention.

Although the CPU 3 described above with reference to FIGS. 1 to 9 is applied to the presence indication data generating unit that generates the presence indication data indicating that the still image data generated by the still photography during the motion picture photography exists on the basis of the still image display management time in the above embodiments, embodiments of the present invention are not limited to the above cases. Various presence indication data generating units including a presence indication data generating circuit in a hardware configuration, which generates the presence indication data indicating that the still image data generated by the still photography during the motion picture photography exists on the basis of the still image display management time, are widely applicable to the presence indication data generating unit according to the embodiment of the present invention.

Although the CPU 3 described above with reference to FIGS. 1 to 9 is applied to the multiplexing unit that sequentially acquires the motion picture data in which the frame image display management times are added to the pieces of the frame image data in predetermined units to output the acquired motion picture data as the recording data while only the motion picture photography is performed and that performs the time division multiplexing to the presence indication data in predetermined units and the motion picture data in predetermined units while sequentially acquiring the presence indication data in predetermined units and sequentially acquiring the motion picture data in predetermined units to output the data subjected to the time division multiplexing as the recording data if the still photography is performed during the motion picture photography in the above embodiments, embodiment of the present invention are not limited to the above cases. Various multiplexing units including a multiplexing circuit in a hardware configuration, which sequentially acquires the motion picture data in which the frame image display management times are added to the pieces of the frame image data in predetermined units to output the acquired motion picture data as the recording data while only the motion picture photography is performed and which performs the time division multiplexing to the presence indication data in predetermined units and the motion picture data in predetermined units while sequentially acquiring the presence indication data in predetermined units and sequentially acquiring the motion picture data in predetermined units to output the data subjected to the time division multiplexing as the recording data if the still photography is performed during the motion picture photography, are widely applicable to the multiplexing unit according to the embodiment of the present invention.

Although the optical disk described above with reference to FIGS. 1 to 9 is applied to the recording medium in which the recording data is recorded in the above embodiments, embodiments of the present invention are not limited to the above cases. Other optical disks, such as a compact disc (CD), and various storage media, such as a video tape, a flash memory, a hard disk drive (HDD), and a flexible disk (FD), are widely applicable to the recording medium according to the embodiment of the present invention as long as the recording data can be recorded in the optical disks and the storage media.

Although the recording-and-reproducing unit 8 described above with reference to FIGS. 1 to 9 is applied to the reading unit that reads out the recording data from the recording medium in the above embodiments, embodiments of the present invention are not limited to the above cases. An external recording apparatus may be applied to the reading unit as long as the external recording apparatus can read out the recording data from the recording medium.

Although the CPU 3 described above with reference to FIGS. 1 to 9 is applied to the demultiplexing unit that demultiplexes the readout recording data into the motion picture data in predetermined units and the presence indication data in predetermined units in the above embodiment, embodiments of the present invention are not limited to the above cases. Various demultiplexing units including a demultiplexer circuit in a hardware configuration, which demultiplexes the readout recording data into the motion picture data in predetermined units and the presence indication data in predetermined units, are widely applicable to the demultiplexing unit according to the embodiment of the present invention.

Although the CPU 3 described above with reference to FIGS. 1 to 9 is applied to the indication processing unit that performs the presence indicating process in which the presence of the still image data generated by the still photography during the motion picture photography is indicated on the basis of the demultiplexed presence indication data when the presence indication data is demultiplexed from the recording data in the above embodiments, embodiments of the present invention are not limited to the above cases. Various indication processing units including an indication processing circuit in a hardware configuration, which performs the presence indicating process in which the presence of the still image data generated by the still photography during the motion picture photography is indicated on the basis of the demultiplexed presence indication data when the presence indication data is demultiplexed from the recording data, are widely applicable to the indication processing unit according to the embodiment of the present invention.

Although the indication start time, which is the still image display management time T1, and the indication stop time T2 after the still image display management time T1, described above with reference to FIGS. 1 to 9, are applied to indication management times used for managing the indication of the presence of the still image data in the above embodiments, embodiment of the present invention are not limited to the above cases. Only the indication start time may be applied to the indication management time. When only the indication start time is applied to the indication management time, a timer may be used to measure the indication stop time.

It should be understood by those skilled in the art that various modifications, combinations, sub-combinations and alterations may occur depending on design requirements and other factors insofar as they are within the scope of the appended claims or the equivalents thereof.

What is claimed is:

1. An image recording apparatus recording motion picture data generated by motion picture photography and still image data generated by still photography, the image recording apparatus comprising:
    a management time adding unit that adds frame image display management times to temporally continuous multiple pieces of frame image data in the motion picture data generated by the motion picture photography, each of the frame image display management times being used for displaying and managing a frame image based on the frame image data;
    a management time detecting unit that detects the frame image display management time added to the piece of the frame image data generated by the still photography as a still image display management time for displaying and managing a still image based on the still image data generated by the still photography if the still photography is performed during the motion picture photography;
    a presence indication data generating unit that generates presence indication data indicating that the still image data generated by the still photography during the motion picture photography exists on the basis of the still image display management time;
    a multiplexing unit that sequentially acquires the motion picture data in which the frame image display management times are added to the pieces of the frame image data in predetermined units to output the acquired motion picture data as recording data while only the motion picture photography is performed and that performs time division multiplexing to the presence indication data in predetermined units and the motion picture data in predetermined units while sequentially acquiring the presence indication data in the predetermined units and sequentially acquiring the motion picture data in the predetermined units to output the presence indication data and the motion picture data subjected to the time division multiplexing as the recording data if the still photography is performed during the motion picture photography; and
    a recording unit that records the recording data on a recording medium.

2. The image recording apparatus according to claim 1, wherein the presence indication data generating unit generates the presence indication data including the still image display management time and identification information used for identifying the still image data generated by the still photography during the motion picture photography.

3. The image recording apparatus according to claim 1, wherein the management time detecting unit detects the frame image display management time added to the piece of the frame image data generated by the still photography as an indication management time used for managing the indication of the presence of the still image data generated by the still photography during the motion picture photography on the basis of the still image display management time, and
    wherein the presence indication data generating unit generates the presence indication data including the indication management time and indication information used for indicating the presence of the still image data generated by the still photography during the motion picture photography.

4. The image recording apparatus according to claim 1, further comprising:
    a reading unit that reads out the recording data from the recording medium;
    a demultiplexing unit that demultiplexes the readout recording data into the motion picture data in the predetermined units and the presence indication data in the predetermined units; and
    an indication processing unit that performs a presence indicating process, in which the presence of the still image data generated by the still photography during the motion picture photography is indicated, on the basis of the presence indication data when the presence indication data is demultiplexed from the recording data.

5. An image reproducing apparatus reproducing motion picture data that is generated by motion picture photography and is recorded and still image data that is generated by still photography and is recorded, the image reproducing apparatus comprising:
    a reading unit that reads out recording data from a recording medium in which the motion picture data is sequentially recorded in predetermined units as the recording data while only the motion picture photography is performed, the motion picture data including temporally continuous multiple pieces of frame image data generated by the motion picture photography and frame image display management times which are used for displaying and managing frame images based on the frame image data and which are added to the multiple pieces of the frame image data, and in which presence indication data and the motion picture data sequentially subjected to time division multiplexing in predetermined units are recorded as the recording data if the still photography is performed during the motion picture photography, the presence indication data being generated by using each of the frame image display management times added to the piece of the frame image data generated by the still photography as a still image display management time for displaying and managing a still image based on the still image data generated by the still photography, the presence indication data indicating that the still image data generated by the still photography during the motion picture photography exists;

a demultiplexing unit that demultiplexes the readout recording data into the motion picture data in the predetermined units and the presence indication data in the predetermined units; and an indication processing unit that performs a presence indicating process, in which the presence of the still image data generated by the still photography during the motion picture photography is indicated, on the basis of the demultiplexed presence indication data when the presence indication data is demultiplexed from the recording data.

6. The image reproducing apparatus according to claim 5, wherein the reading unit reads out the recording data from the recording medium in which the motion picture data and the presence indication data including the still image display management time and identification information used for identifying the still image data are sequentially subjected to the time division multiplexing in the predetermined units and are recorded as the recording data, and wherein, when the presence indication data is demultiplexed from the recording data, the indication processing unit reproduces the still image data corresponding to the identification information included in the presence indication data as the presence indicating process on the basis of the demultiplexed presence indication data and replaces the frame image data to which the frame image display management time as the still image display management time is added with the still image data to output the still image data for display.

7. The image reproducing apparatus according to claim 5, wherein the reading unit reads out the recording data from the recording medium in which the presence indication data and the motion picture data are sequentially subjected to the time division multiplexing in the predetermined units and are recorded as the recording data, the presence indication data including the frame image display management time that is detected on the basis of the still image display management time and that is added to the piece of the frame image data generated by the still photography as an indication management time used for managing the indication of the presence of the still image data generated by the still photography during the motion picture photography and including indication information used for indicating that the still image data exists, and wherein the indication processing unit indicates that the still image data generated by the still photography during the motion picture photography exists, by using the indication information at the indication management time included in the presence indication data as the presence indicating process on the basis of the demultiplexed presence indication data, when the presence indication data is demultiplexed from the recording data.

8. An image recording method of recording motion picture data generated by motion picture photography and still image data generated by still photography, the image recording method comprising the steps of:

adding frame image display management times to temporally continuous multiple pieces of frame image data in the motion picture data generated by the motion picture photography, each of the frame image display management times being used for displaying and managing a frame image based on the frame image data;

detecting the frame image display management time added to the piece of the frame image data generated by the still photography as a still image display management time for displaying and managing a still image based on the still image data generated by the still photography if the still photography is performed during the motion picture photography;

generating presence indication data indicating that the still image data generated by the still photography during the motion picture photography exists on the basis of the still image display management time; and sequentially acquiring the motion picture data in which the frame image display management times are added to the pieces of the frame image data in predetermined units to record the acquired motion picture data on a recording medium as recording data while only the motion picture photography is performed and performing time division multiplexing to the presence indication data in predetermined units and the motion picture data in predetermined units while sequentially acquiring the presence indication data in the predetermined units and sequentially acquiring the motion picture data in the predetermined units to record the presence indication data and the motion picture data on the recording medium as recording data if the still photography is performed during the motion picture photography.

9. An image reproducing method of reproducing motion picture data that is generated by motion picture photography and is recorded and still image data that is generated by still photography and is recorded, the image reproducing method comprising the steps of:

reading out recording data from a recording medium in which the motion picture data is sequentially recorded in predetermined units as the recording data while only the motion picture photography is performed, the motion picture data including temporally continuous multiple pieces of frame image data generated by the motion picture photography and frame image display management times which are used for displaying and managing frame images based on the frame image data and which are added to the multiple pieces of the frame image data, and in which presence indication data and the motion picture data sequentially subjected to time division multiplexing in predetermined units are recorded as the recording data if the still photography is performed during the motion picture photography, the presence indication data being generated by using each of the frame image display management times added to the piece of frame image data generated by the still photography as a still image display management time for displaying and managing a still image based on the still image data generated by the still photography, the presence indication data indicating that the still image data generated by the still photography during the motion picture photography exists;

demultiplexing the readout recording data into the motion picture data in the predetermined units and the presence indication data in the predetermined units; and performing a presence indicating process, in which the presence of the still image data generated by the still photography during the motion picture photography is indicated, on the basis of the demultiplexed presence indication data when the presence indication data is demultiplexed from the recording data.

* * * * *